July 12, 1966     R. BERGUNDER     3,260,233
AIR PRESSURE GAUGE FOR PNEUMATIC TIRES
Filed Dec. 5, 1963     3 Sheets-Sheet 1

Inventor
Roy Bergunder
By
Atty.

July 12, 1966 R. BERGUNDER 3,260,233
AIR PRESSURE GAUGE FOR PNEUMATIC TIRES
Filed Dec. 5, 1963 3 Sheets-Sheet 2
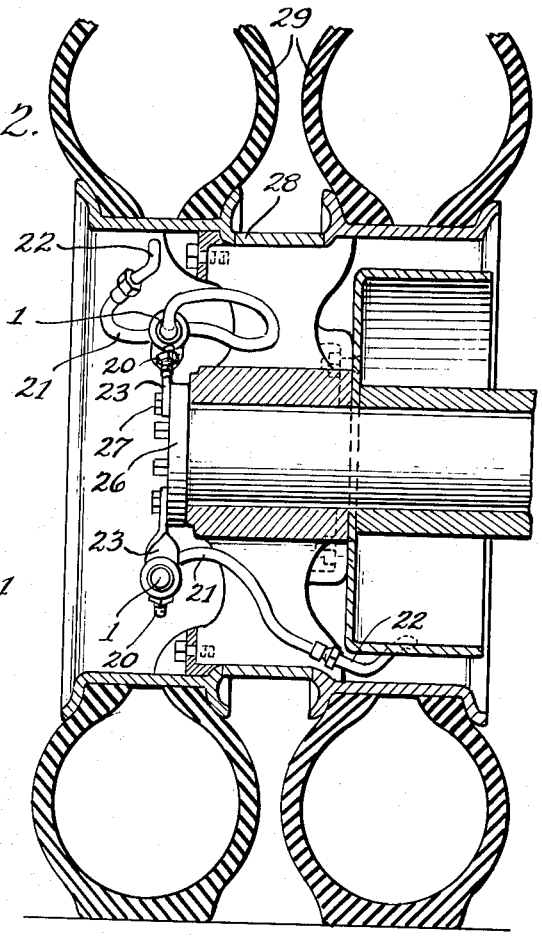
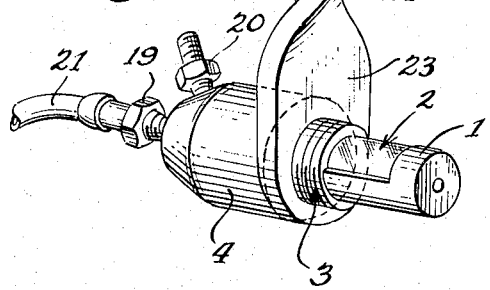
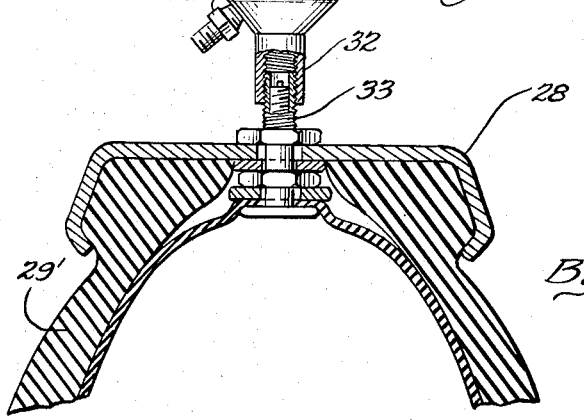
Inventor
Roy Bergunder
By
Atty.

July 12, 1966 R. BERGUNDER 3,260,233
AIR PRESSURE GAUGE FOR PNEUMATIC TIRES
Filed Dec. 5, 1963 3 Sheets-Sheet 3
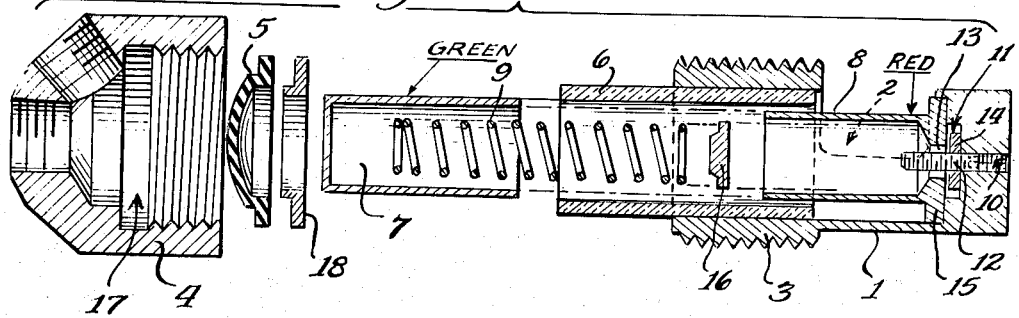
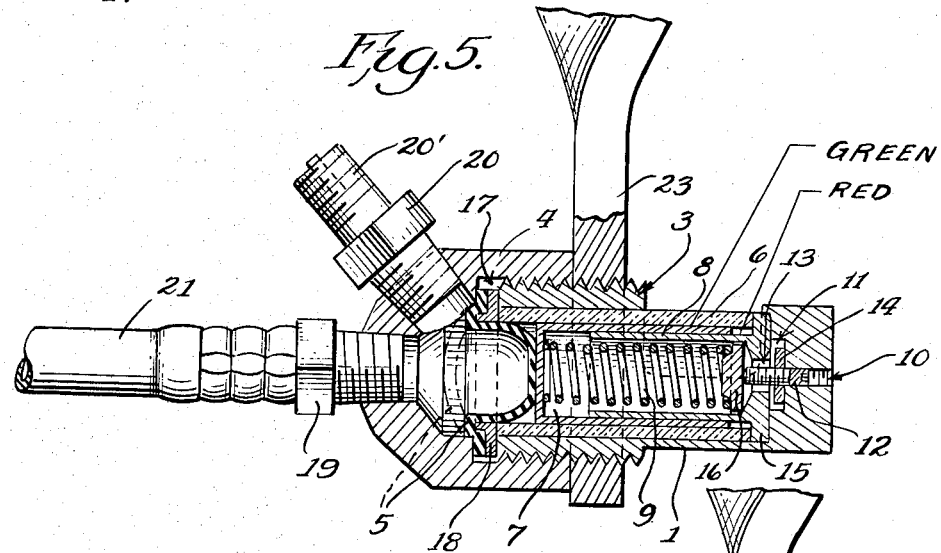
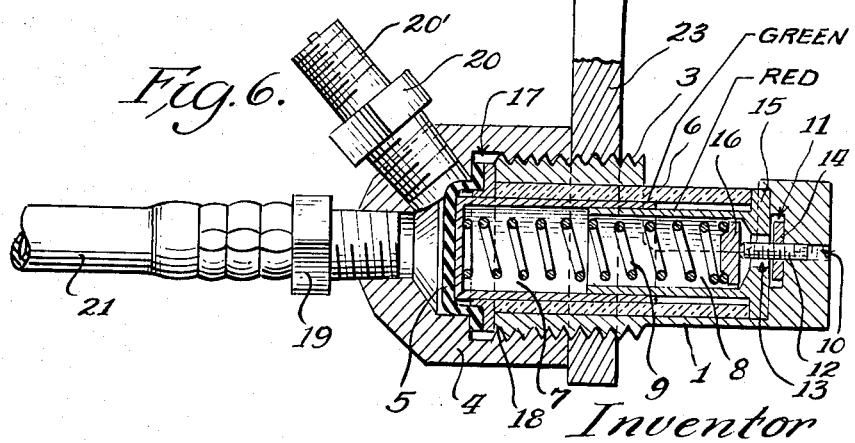
Inventor
Roy Bergunder
By W. F. Kellogg
Atty.

United States Patent Office 3,260,233
Patented July 12, 1966

3,260,233
AIR PRESSURE GAUGE FOR PNEUMATIC TIRES
Roy Bergunder, Palos Hills, Ill., assignor of one-half to Richard Jousma, Chicago, Ill.
Filed Dec. 5, 1963, Ser. No. 328,286
9 Claims. (Cl. 116—34)

This invention relates to pneumatic tire accessories, especially, though not use limited to and for pneumatic tires of trucks and similar heavy duty vehicles in connection with which it is essential to their economical and effective usage that the pressure of air therewithin (inflation) shall be maintained at the proper and recommended poundage—neither over nor under inflated.

An object of the invention is to provide a pneumatic tire pressure gauge of compact, dependable and sturdy construction, mountable in a minimum of space on or in immediate proximity to a wheel carrying the same in a manner such as will permit its convenient, ready and satisfactory inspection, this for the purpose of ascertaining the tire air pressure.

Another and important object of the invention is to provide a pneumatic tire pressure gauge of such construction that a plurality or pair thereof can be effectively mounted in paired and juxtaposed relation on a single wheel for constantly and dependably measuring and indicating the poundage or pressure of the air with which the tires of dual positioned or paired wheels of a heavy duty vehicle are inflated.

A further object of the invention is to provide a pneumatic tire pressure gauge in which the air pressure responsive motion transmitting means and the indicating means therefor are so constructed, arranged and cooperatively interrelated as to permit their housing within a casing of minimum size, hence, assuring its satisfactory mounting in space limited areas and its non-interference with the running gear of an equipped vehicle, yet readily readable at all times.

Yet another and important aim of the invention is to provide to the gauge an advantageous and novel form of mounting therefor, whereby it, or a pair thereof, may be conveniently and securely mounted on an appropriate portion of a pneumatic tire equipped wheel, or on one of the dual pneumatic tire equipped wheels of a motor driven vehicle, or on their axle, the mounting being such that the gauge, or a pair thereof, will at all times be readily visible for inspection, and if desired or required, easily and quickly removed for corrective attention, and as easily and quickly remounted or replaced.

The foregoing, as well as other objects, advantages and meritorious teachings of my invention, will be in part obvious and in part pointed out in the following detailed disclosure thereof, when taken in conjunction with the accompanying drawings, it being understood that the forms of invention presented herein are precise and what are now considered to be the better modes of embodying its principles, but that other and further modifications and changes may be made in specific embodiment without departing from its essential features.

In the drawings:

FIGURE 2 is a vertical transverse section therethrough illustrating the manner in which communication is effected between the pneumatic tires of dual wheels and the provided gauges.

FIGURE 3 is a perspective of but one of the gauges and an individual mounting bracket therefor.

FIGURE 4 is an enlarged and partially disassembled, though parts interrelated view in longitudinal section through one of my improved pneumatic tire air pressure gauges.

FIGURE 5 is an enlarged longitudinal section through one of said gauges in parts assembled relation, and wherein its air pressure actuated linear motion transmitting means is shown in its distended or operated position and having transmitted such motion to the air pressure indicating means of the gauge.

FIGURE 6 is a view similar to FIGURE 5, but wherein said linear motion transmitting means and air pressure indicating means are in inactivated positions.

Figure 8:
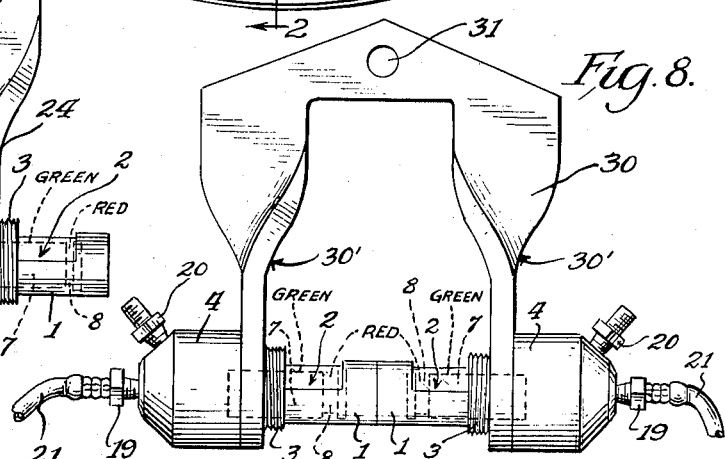

FIGURE 8 is a side elevation of a different form of bracket for mounting a pair of my improved pneumatic tire air pressure indicating gauges in paired and longitudinally opposed endwise contacting relation, such form of mounting being, of course, of no less importance to usage of the invention, and in some instances, being such as to afford greater advantages and benefits to the user thereof, and, FIGURE 9 is a side elevation, partly in section, of a slightly modified form of mounting or attachment of my improved gauge upon and directly to the valve stem of a conventional form of pneumatic tire valve, the stem being shown partially in section and the tire fragment and rim in transverse section.

Referring in detail to the drawings, particularly, to the improved gauge, per se, the same, generally, comprises a tubular cross-sectionally circular casing 1, closed at its normally outer end and formed with a cut-away portion or window 2, and having its normally inner end portion enlarged and externally screw-threaded, as at 3; a ported cup-like internally screw-threaded fitting 4 turnable onto and with the screw-threaded portion 3 of the casing; a circularly shaped diaphragm 5 made of rubber or other suitable resilient, stretchable and durable composition received by and seated within the fitting 4; a transparent and wear resistant tubular shield or sleeve 6 of cross-sectional shape and size which will permit its snug reception within the casing 1; a cylindrical cup-like indicator 7 preferably, though not necessarily made of a suitable metal and of cross-sectional shape and size that it will be snugly and slideably received by and in the sleeve 6 and telescopically engaged over a second cylindrical cup-like indicator 8, made of suitable metal, anchored in the casing 1 in a manner hereinafter more fully described, and a tension adjustable coiled spring 9 engaged in the cup-like indicators 7 and 8 in endwise bearing engagement with their respective closed ends, all as shown in FIGURES 4, 5 and 6 of the drawings.

The end wall of the casing 1 has a concentrically located screw-threaded opening 10 formed in and through the same, while the inner side thereof is chambered, as at 11. A screw 12 is turned into and through the threaded opening into the casing and through an opening 13 in the adjacent end wall of the indicator 8, the extent of such entry being selectively regulatable. To lock the screw in an adjusted or selected position, a lock-nut 14 is engaged therewith and is seatable in the end wall chamber 11.

In assembling the working components of the gauge, the cup-like cylindrical indicator 8 is snugly engaged in the casing 1 and coaxially positioned in apposed relation to and contact with its end wall, being annularly flanged or shouldered, as at 15, and snugly seated in the outermost portion of the chamber 11 with the opening 13 in alignment with the casing end wall screw-threaded opening 10. Thereupon, the transparent tubular shield or sleeve 6, whose outside diameter corresponds to that of the flanged end wall of the indicator 8, is endwise abuttingly engaged therewith, enveloping the same and by reason of its greater length, extending therebeyond.

The coiled spring 9, of greater length than the indicator 8, is endwise seated therein and has a follower disk 16 interposed between its inner end and the indicator end wall to permit thrust engagement of the screw 12 therewith whereby to effect tensioning thereof.

At this point of assembly, the cylindrical indicator 7 is snugly and slideably entered into the transparent sleeve 6, receiving the extended end portion of the coiled spring 9 therein with its adjacent end in abutting and bearing engagement with the end wall thereof. The inside diameter of the slideable indicator is such that it will snugly and slideably engage over and about (telescope) the indicator 8.

At this point, it is to be noted that the outer peripheral surfaces of the indicators 7 and 8 are of different colors, that of the indicator 7 being preferably green, and that of the indicator 8 being preferably red.

In order that rectilinear movement under urge of the pressured air within an equipped tire may or shall be transmitted to the movable or slideable green colored indicator, the diaphragm 5 is seated within a chambered portion 17 of the fitting 4 and is provided with an anchoring washer 18 engaged about and with its outwardly flanged perimeter portion. Thus, with turning of the fitting onto the screw-threaded portion 3 of the casing, said diaphragm will have bearing engagement or contact upon and with the adjacent end wall of the indicator 7.

To effect communication between the gauge and a pneumatic tire equipped therewith, the ports of the fitting 4, opening into its diaphragm receiving chamber 17, have suitable nipples 19 and 20 threadedly engaged therein.

Figure 1:
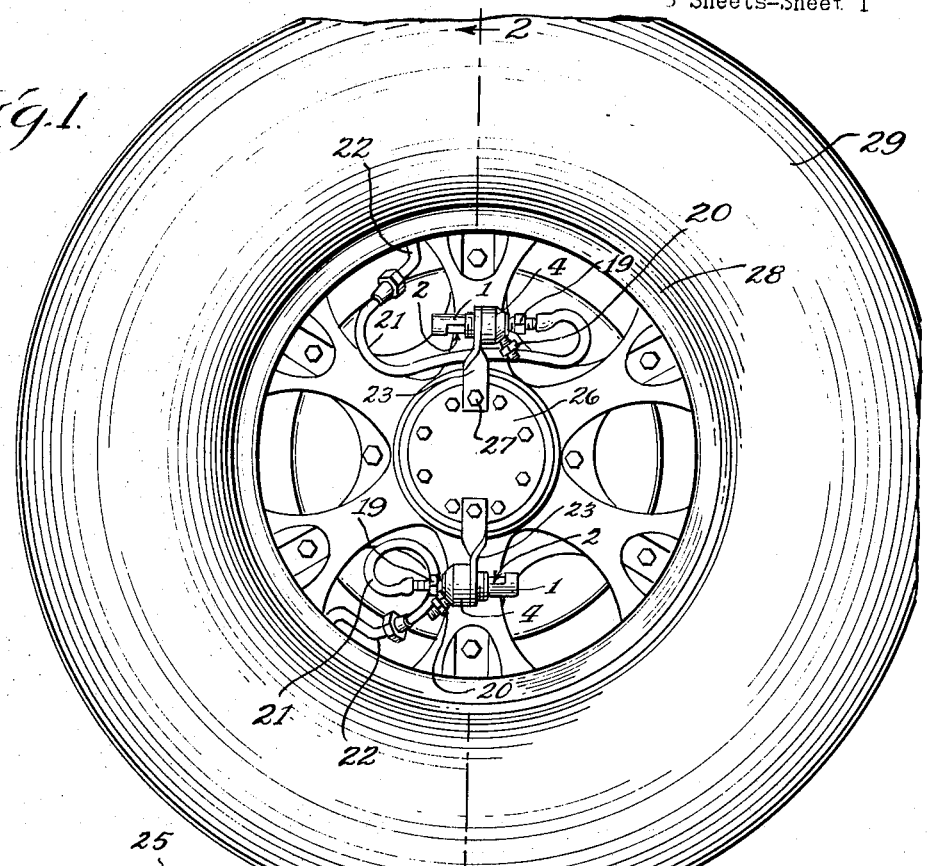
FIGURE 1 is a side elevation of one of the dual or paired pneumatic tire equipped wheels of a heavy duty motor driven vehicle, truck, or trailer, provided with my invention, a portion of the tire being broken away.
Figure 7:
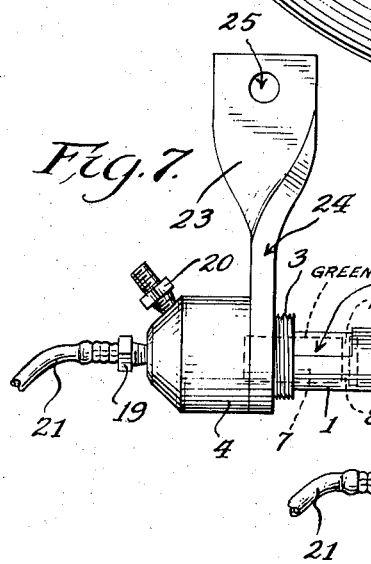
FIGURE 7 is a side elevation, somewhat reduced in size, of the form of gauge and its mounting bracket as shown in FIGURE 3, and wherein the green colored portion of its air pressure indicating means, or indicator, is shown exposed, as when the air pressure of a tire equipped therewith accords with that recommended by the manufacturer.

The nipple 19 has one end of a flexible hose 21 connected to and communicating therewith, the remaining end of which is extended into and communicatively connected to the usual air input check valve 22 of an equipped pneumatic tire, as shown in FIGURES 1 and 2 of the drawings.

The nipple 20 is provided with, or carries, a conventional or usual type of air input check valve (not shown) housed in its outer portion 20'. Thereby, inflation of a pneumatic tire having the gauge connected thereto will be permitted by directly connecting an air supply hose coupling fitting to the same, dispensing with the need for disconnecting the aforesaid hose 21 from the tire valve 22 and connecting said coupling fitting to it for inflating purposes.

Operative attachment and support of the improved gauge can be effected in several manners, one of which is illustrated by the FIGURES 1, 2, 3 and 7. Herein, a bracket arm 23 consisting of a metal bar or strip twisted upon and intermediately of itself so that the upper and lower portions are at relatively 90° angles apart is employed, as indicated at 24. The upper end of the strip has a bolt receiving opening 25 therein, while its lower end has a threaded opening therein the diameter of which is such as will permit the threaded engagement or reception of the screw-threaded part 3 of the gauge casing 1 therein and therethrough. To operatively mount the thus received gauge, the upper portion of the strip may be and preferably is engaged flatly against a portion of the wheel axle plate 26 and a bolt 27 is engaged through its opening into and with said plate, as seen in FIGURES 1 and 2. Thereby, the gauge will be positioned in substantially parallel relation to the plate and the wheel, occupying a minimum of space and being readily and satisfactorily viewable for reading.

Where, as illustrated by the drawings, the improved gauge is used in connection with dual or paired wheels 28 and tires 29, a pair thereof are similarly mounted on the wheel axle plate 26, preferably, but not necessarily, in opposed relation (see FIGURE 1). Thus, the aforesaid hoses 21 are individually connected to and communicate with the valves 22 of the paired pneumatic tires.

Modification of the above manner of mounting the paired gauges in operative positions may, in some instances of installation, be desired or required. To such end, that form of mounting bracket illustrated by the FIGURE 8 may be employed. It consists of a single piece bar or strip of substantially U-shaped form, identified by the reference numeral 30. The opposite and lateral legs thereof are twisted intermediately of themselves, as at 30', in a maner similar to that of the bracket arm 23 and have screw threaded openings in their end portions whereby to threadedly receive a pair of relatively endwise opposed gauges therein and therethrough, as shown. The basal or body portion of the mounting bracket has a bolt receiving opening 31 therein, this, in order that a bolt such as above indicated at 27, can be engaged there through and with a wheel axle plate. When so mounted or secured, the bracket 30 will be positioned in parallel relation to the axle plate and wheel, and the opposed gauges will be supported in positions where they can be satisfactorily viewed and read. Of course, the manner of connecting said gauges to the equipped pneumatic tires will be the same as hereinbefore described.

Should it be desired to individually and directly connect or mount the gauge on a pneumatic tire, its casing fitting 4 may be modified in the manner illustrated by FIGURE 9 of the drawings. Here, an internally screw-threaded coaxially disposed sleeve extension 32 is affixed to or integral with the outer and reduced end of said fitting and opens into or communicates with the gauge interior components via a port similar to that shown in the FIGURES 4, 5 and 6 in and to which the hose 21 is connected. The screw-threaded inside periphery of the sleeve is such that it can be turned onto the correspondingly threaded stem 33 and thereby effect direct communication between the pneumatic tire 29' and gauge. In this form of the gauge, its fitting 4 is provided with an air intake or inlet check valve fitting 34 in order to permit inflation or deflation of the equipped tire.

In using my improved pneumatic tire pressure indicating gauge, i.e., any one of the hereinbefore described forms thereof, as and when the same is attached or connected to a penumatic tire, air from the same is discharged into the gauge casing via the hose 21 and nipple 19. The thus introduced air pressure will exert an inward thrust upon the diaphragm 5, causing it to assume a position such as shown in FIGURE 5 of the drawings. By reason of this inward flexing of the diaphragm under pressure of the introduced air, the indicator 7 will have sliding movement transmitted thereto, causing it to be telescopically engaged over the immovably positioned indicator 8 within the casing 1. Thus, the green colored peripheral surface of the indicator 7 will be exposed through the casing window 2. Dependent upon the extent of such exposure, the gauge reader may accurately ascertain or determine if the equipped pneumatic tire is properly inflated or over or under inflated, and, of course, will effect such correction as may be required.

Obviously, should the pressure of air within an equipped pneumatic tire be insufficient, i.e., below the recommended pressure therefor, the tension of the coiled spring 9 within the indicators 7 and 8 will counter its inward thrust via the diaphragm 5 and will effect outward sliding movement of the indicator 7, as for example, to the position shown in dotted lines in the FIGURE 5 of the drawings. Thereupon, the red colored peripheral surface of the immovable indicator 8 will be exposed to view of a reader of the gauge, indicating the unsatisfactory degree of inflation of the equipped tire in order that necessary correction may be made.

I claim:
1. An air pressure indicating gauge for pneumatic tires, comprising:
   (a) a casing having a window therein and one end open and its other end substantially closed,
   (b) a tubular first indicator in the casing adjacent its substantially closed end viewable through its window,
   (c) a transparent sleeve received by and within the casing and about the first indicator engaging the inner end thereof,
   (d) a tubular second indicator slideably received by and within the sleeve and over and about the first indicator,
   (e) spring means within the first and second indicators bearingly engaged with each thereof,
   (f) a cup-like ported fitting engaged with and closing the open end of the casing, and,
   (g) air pressure actuatable means within the fitting engaging the adjacent end of said second indicator.

2. An air pressure indicating gauge for pneumatic tires, comprising:
   (a) a casing having a window therein and one end open and its remaining end substantially closed,
   (b) a tubular first indicator in the casing adjacent its substantially closed end viewable through its window,
   (c) a transparent sleeve received by and within the casing and about the first indicator engaging the inner end thereof,
   (d) a tubular second indicator slideably received by and within the sleeve and telescopically engaged with the first indicator,
   (e) spring means within the first and second indicators normally imparting outward thrust to the second indicator,
   (f) an internally chambered cup-like ported fitting engaged with and closing the open end of the casing, and,
   (g) an air pressure actuatable means within the chamber of said fitting engaging the adjacent end of the second indicator.

3. An air pressure indicating gauge for pneumatic tires, comprising:
   (a) a casing having a window therein and one end open and its remaining end substantially closed,
   (b) a tubular first indicator in the casing adjacent its substantially closed end viewable through its window,
   (c) a transparent sleeve received by and within the casing and about the first indicator engaging the inner end thereof,
   (d) a tubular second indicator slideably received by and within the sleeve and telescopically engaged with the first indicator,
   (e) means engaging the first and second indicators yieldably resisting inward movement of the second indicator with relation to the first indicator and normally imparting outward thrust to said second indicator,
   (f) a cup-like fitting engaged with and closing the open end of the casing, and,
   (g) air pressure actuatable means within the fitting engaging the adjacent end of said second indicator.

4. An air pressure indicating gauge for pneumatic tires, comprising:
   (a) a casing having a window therein and one end open and its remaining end substantially closed,
   (b) a tubular first indicator in the casing adjacent its substantially closed end viewable through its window,
   (c) a transparent sleeve received by and within the casing and about the first indicator engaging and securing the same against movement,
   (d) a tubular second indicator slideably received by and within the sleeve and telescopically engaged with indicator,
   (e) an expansible coiled spring within the first and second indicators bearingly engaged at its opposite ends with each thereof,
   (f) means engaged in the substantially closed end of the casing engageable with the adjacent end of said coiled spring for selectively modulating its tension,
   (g) a cup-like ported fitting engaged with and closing the open end of the casing, and,
   (h) air pressure actuatable means within the fitting engaging the adjacent end of the second indicator.

5. An air pressure indicating gauge for pneumatic tires, comprising:
   (a) a casing having a window therein and one end open and its remaining end substantially closed,
   (b) a tubular first indicator in the casing adjacent its substantially closed end viewable through its window,
   (c) a transparent sleeve received by and within the casing and about the first indicator engaging the inner end thereof and anchoring the same within said casing,
   (d) a tubular second indicator slideably received by and within the sleeve and telescopically engaged with the first indicator,
   (e) means within and engaging the first and second indicators yieldably resisting inward movement of the second indicator with relation to the first indicator and normally imparting outward thrust to said second indicator,
   (f) an internally chambered cup-like ported fitting engaged with and closing the open end of the casing,
   (g) a diaphragm seated within the fitting chamber contacting the adjacent end of said second indicator,
   (h) said fitting having ports therein, and,
   (i) separate air conducting means engaged in the fitting ports and communicating with the chamber therein.

6. An air pressure indicating gauge for pneumatic tires, comprising:
   (a) a casing having a window therein and one end open and its remaining end substantially closed,
   (b) a tubular first indicator in the casing adjacent its substantially closed end viewable through its window,
   (c) a transparent sleeve received by and within the casing and about the first indicator engaging the inner end thereof whereby to immobilize the same within the casing,
   (d) a tubular second indicator slideably received by and within the sleeve and telescopically engaged with the first indicator,
   (e) an expansible coiled spring within the first and second indicators having bearing engagement at its opposite ends with said indicators,
   (f) means engaged in and through the substantially closed end of the casing and through the first indicator engageable with the adjacent end of said spring for selectively modulating its tension,
   (g) an internally chambered cup-like fitting having separate ports therein and therethrough communicating with said chamber,
   (h) a diaphragm received and retained in said chamber beyond said ports and contacting the adjacent end of the second indicator, and,
   (i) air conducting means engaged in said ports and communicating with said chamber.

7. In combination, an air pressure indicating gauge for pneumatic tires, including:
   (a) a casing having a window therein and one end open and its other end substantially closed,
   (b) a tubular first indicator in the casing adjacent its substantially closed end viewable through its window,
   (c) a transparent sleeve received by and within the casing and about the first indicator engaging the inner end thereof,
   (d) a tubular second indicator slideably received by and within the sleeve and over and about the first indicator,
(e) spring means within the first and second indicators bearingly engaged with each thereof,
(f) a cup-like ported fitting engaged with and closing the open end of the casing,
(g) air pressure actuatable means within the fitting engaging the adjacent end of said second indicator,
(h) a mounting bracket receiving and supporting the casing, and,
(i) said bracket having the upper end lower portions thereof arranged in planes at substantially right angles to each other whereby the casing will be supported and positioned in a plane parallel to the side of the pneumatic tires.

8. In combination, a pair of air pressure indicating gauges for dually mounted pneumatic tires, each including:
(a) casings each having a window therein,
(b) air pressure operatively responsive indicator means received by and movable in each of the casings, and,
(c) a mounting bracket of substantially U-shaped form receiving and supporting said casings in its opposite sides and in paired and longitudinally juxtaposed relation.

9. In combination, a pair of air pressure indicating gauges for the pneumatic tires of dual mounted wheels, each including:
(a) a casing having a window therein and an air pressure responsive and operable means movable therein visible through the window, and,
(b) a substantially U-shaped mounting bracket receiving and supporting said casings in longitudinally opposed and abutting relation in the lateral extremities thereof and in substantially parallel relation to one of said walls.

References Cited by the Examiner

UNITED STATES PATENTS 3,208,425   9/1965   Jousma et al. _____ 116—34

LOUIS R. PRINCE, *Primary Examiner.*